United States Patent [19]
Campbell

[11] 3,844,426
[45] Oct. 29, 1974

[54] METHOD FOR CUTTING PANELS

[76] Inventor: James W. Campbell, 4408 N. Haltom Rd., Fort Worth, Tex. 76117

[22] Filed: Nov. 24, 1972

[21] Appl. No.: 309,113

Related U.S. Application Data

[60] Continuation of Ser. No. 71,104, Sept. 10, 1970, which is a division of Ser. No. 805,943, Feb. 17, 1969, Pat. No. 3,662,789.

[52] U.S. Cl. ............ 214/152, 144/245 F, 214/1.6, 214/8.5 A, 214/8.5 SS, 271/42
[51] Int. Cl. ............................................. B65h 5/00
[58] Field of Search ................ 214/1.6, 1.7, 8.5 A; 144/245 R, 245 A, 245 B, 245 C, 245 E, 245 F, 242; 271/42; 83/47

[56] References Cited
UNITED STATES PATENTS

| | | | |
|---|---|---|---|
| 1,347,536 | 7/1920 | Downie | 214/1.6 |
| 2,921,788 | 1/1960 | Lawrence | 271/34 |
| 3,033,067 | 5/1962 | Thumin | 83/277 X |
| 3,522,825 | 8/1970 | Wehner | 83/47 X |

*Primary Examiner*—Frank E. Werner
*Attorney, Agent, or Firm*—Kinzer, Plyer, Dorn & McEachran

[57] ABSTRACT

The method and apparatus for efficiently cutting accurately sized panels in an unlimited combination of sizes and shapes from larger sheets. The sheets are automatically counted and stacked on a gauge table, the stack is clamped by jaws which establish a reference line relative to a cutting station, and the stack is advanced along the table for accurately dimensioned rip cuts. One or more of these cut stacks are then moved on a rip run-out unit to a cut-off infeed and gauge table where they are automatically aligned, clamped to establish a second reference line, and accurately advanced to a cut-off station where cross-cut sawing procedures finished panels. The stacks are moved and gauged by either digital or analog hydraulic servo motors which accurately position the reference lines relative to the saw stations by controlled deceleration of the load to stop the stacks. At each saw station holddowns prevent sheet displacement as the saw traverses. Each saw automatically senses cutting load and returns to its initial position immediately upon finishing a cut. Linear saw speed is controlled as a function of saw load. Means are provided to automatically remove trim and scrap.

5 Claims, 30 Drawing Figures

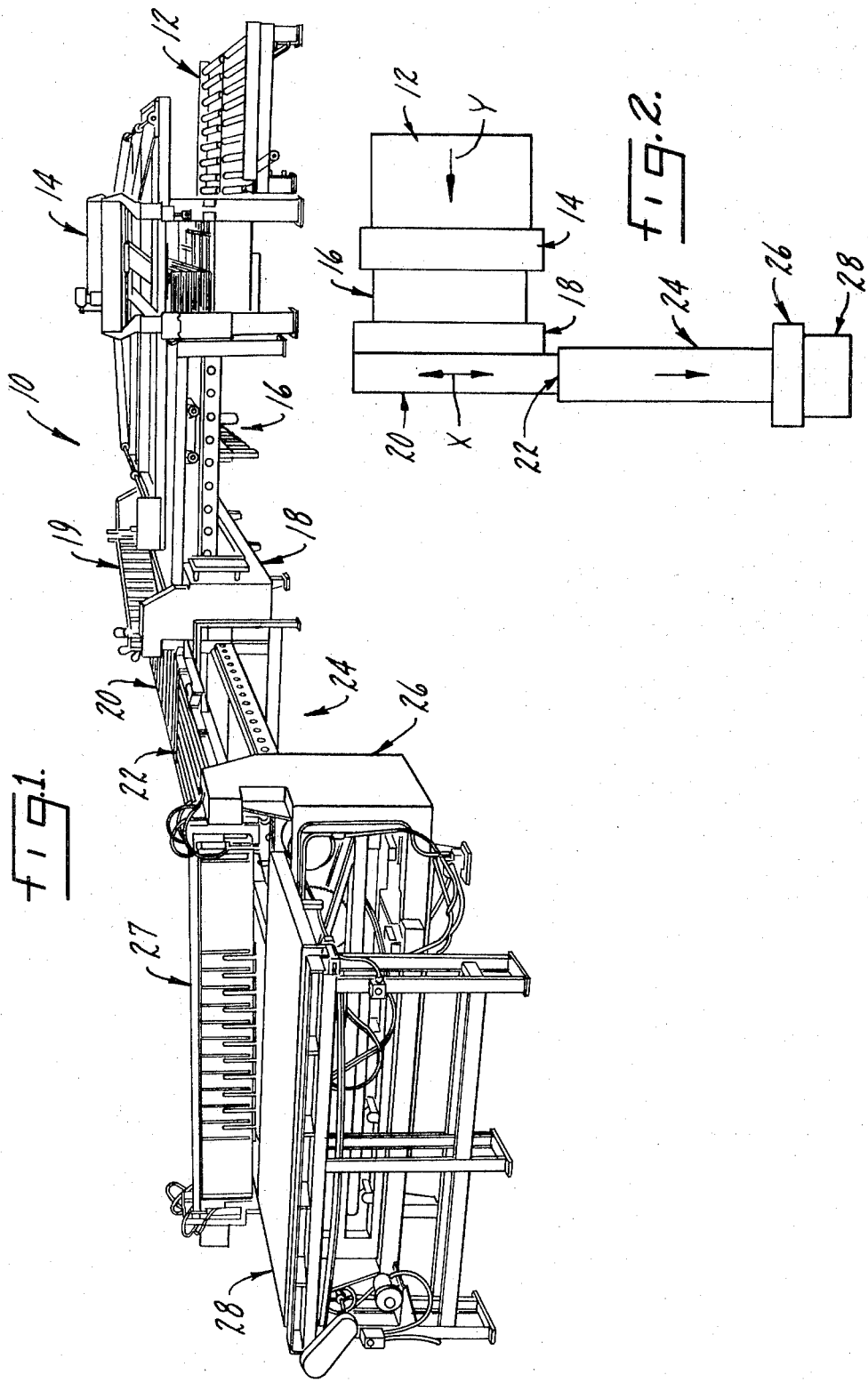

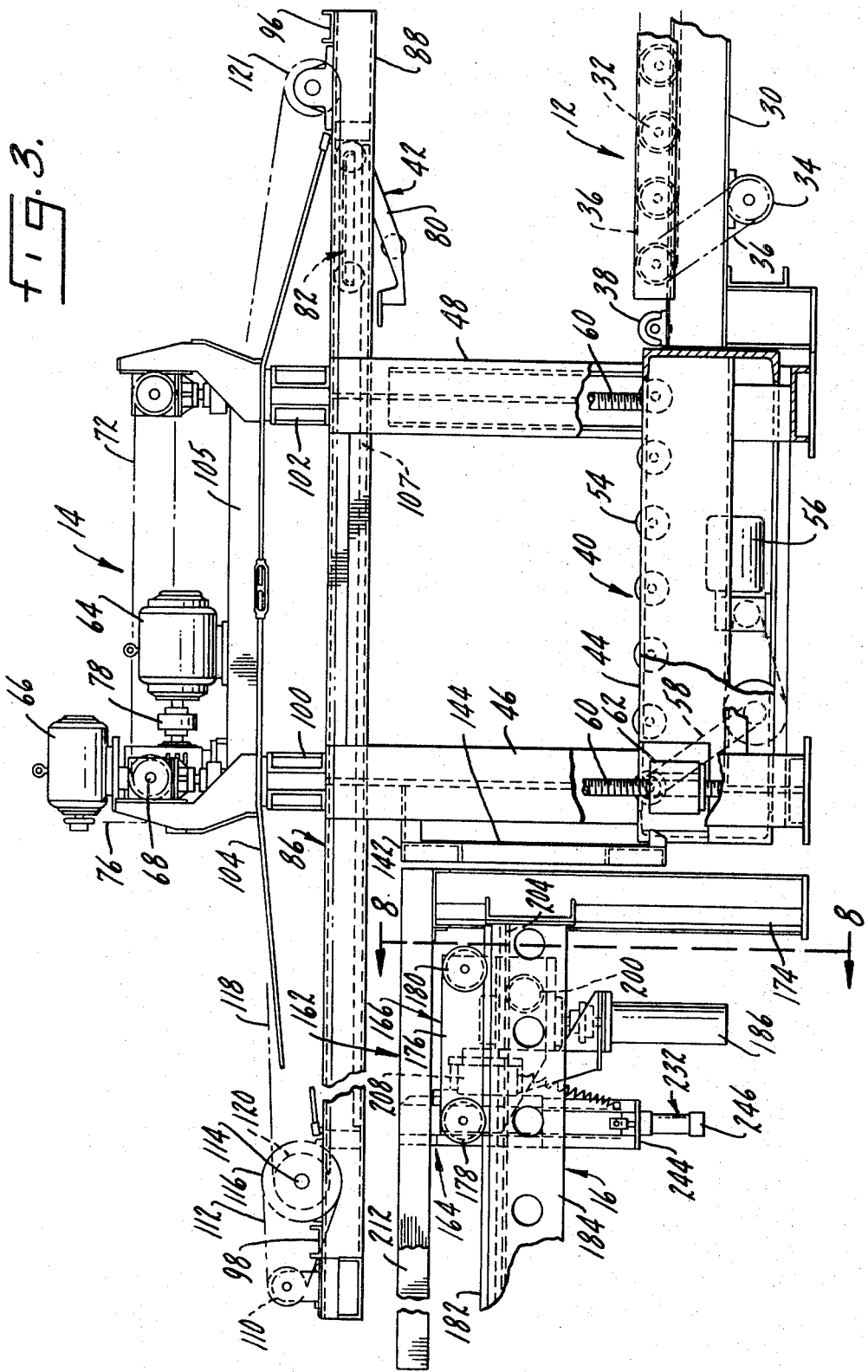

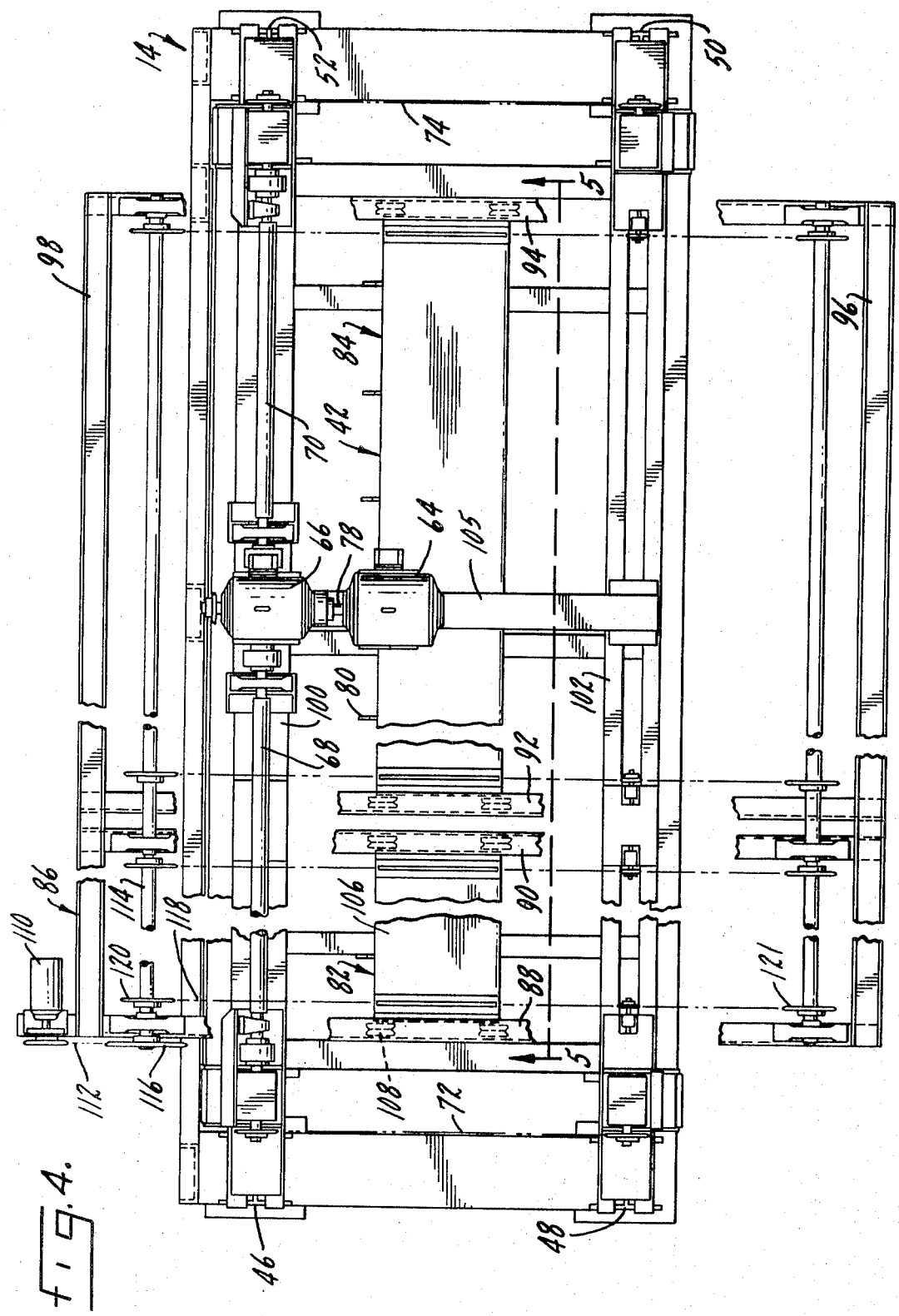

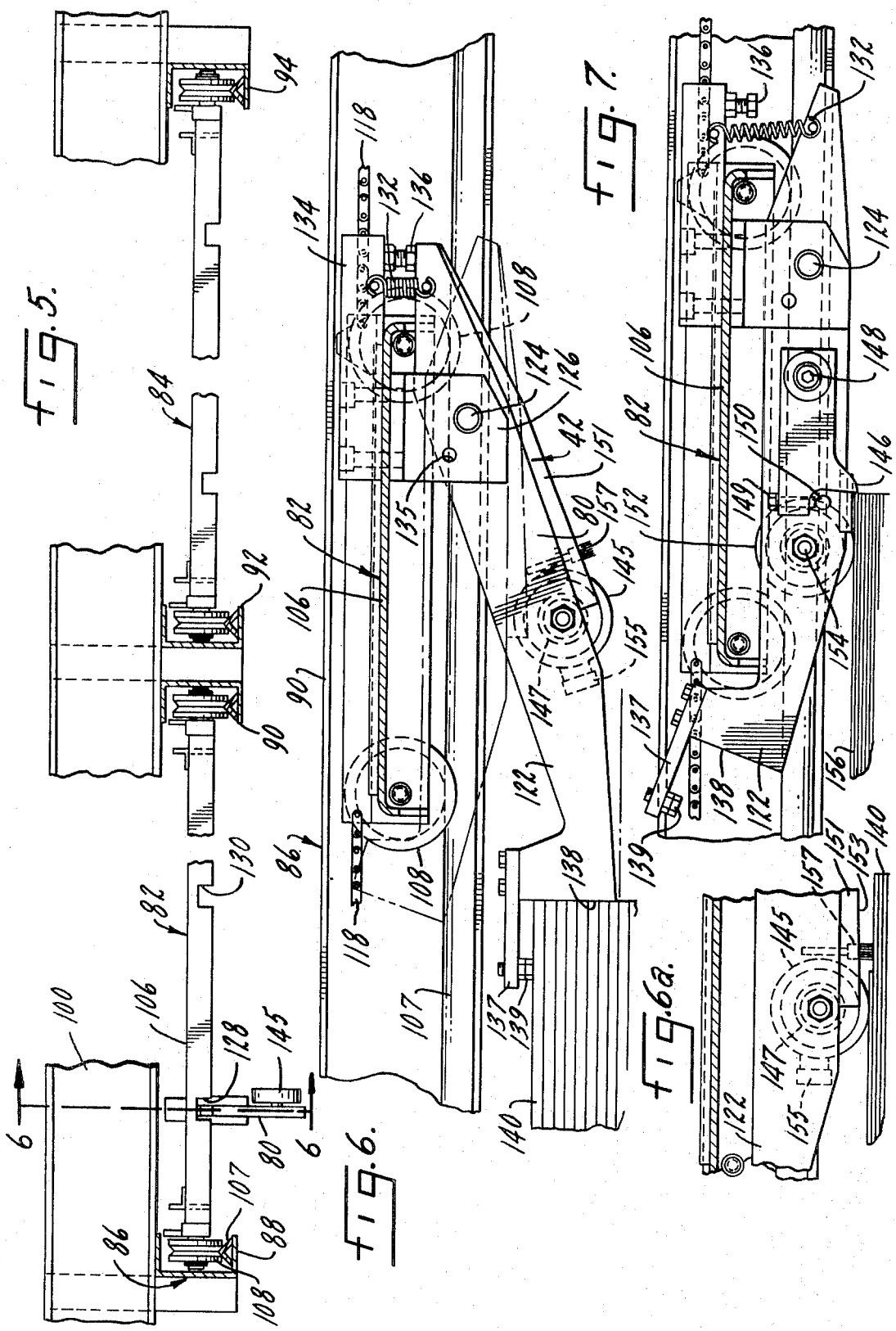

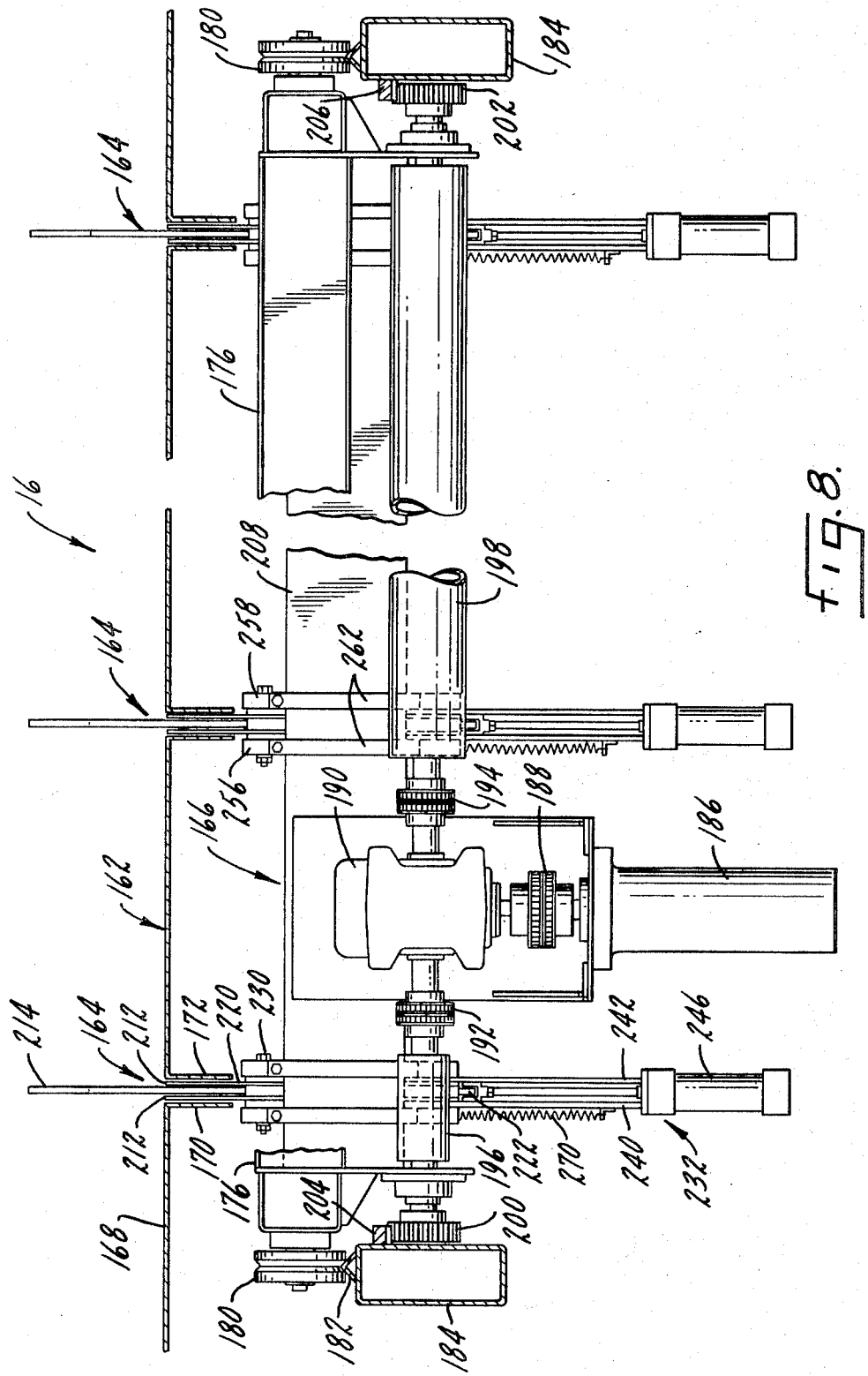

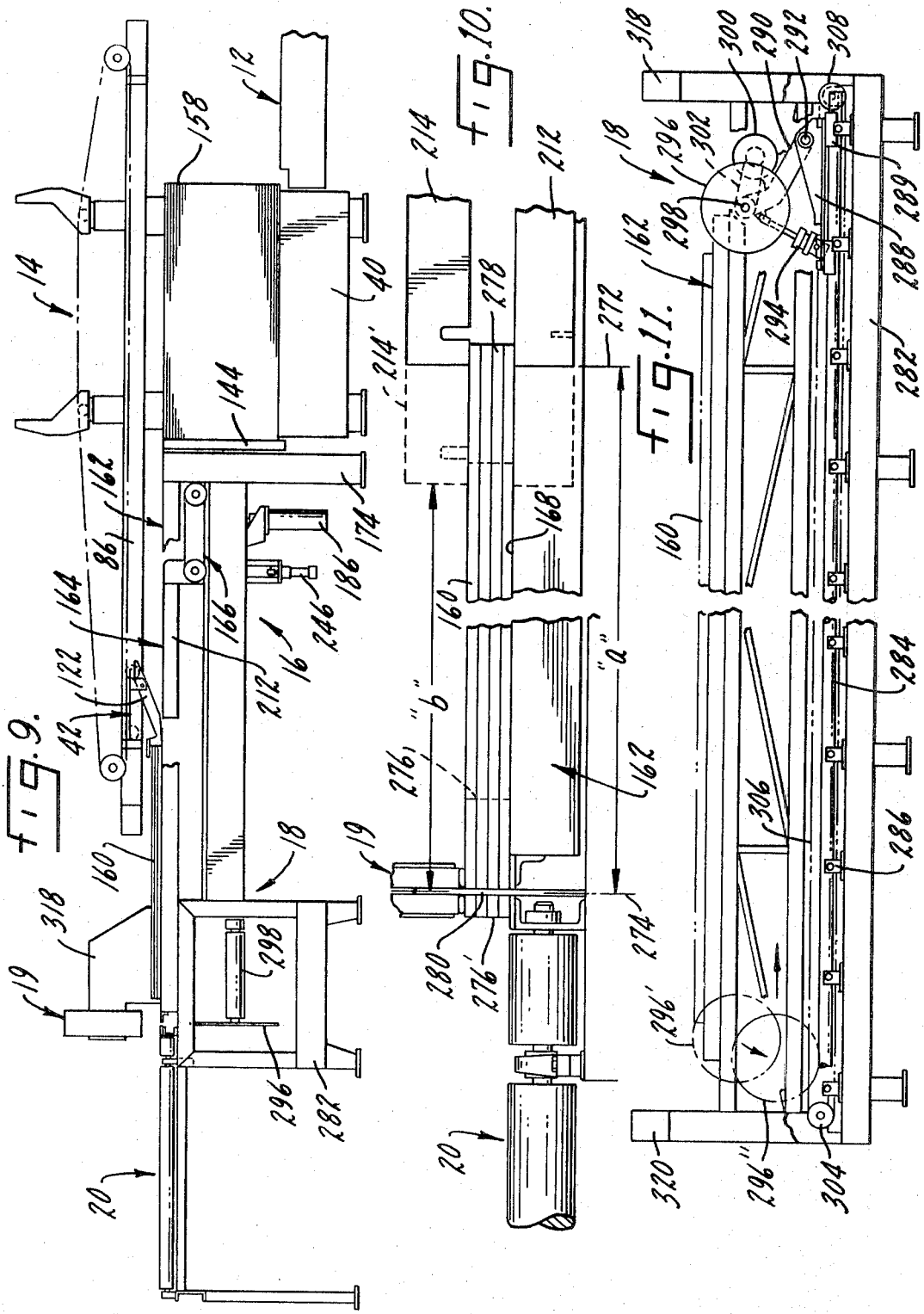

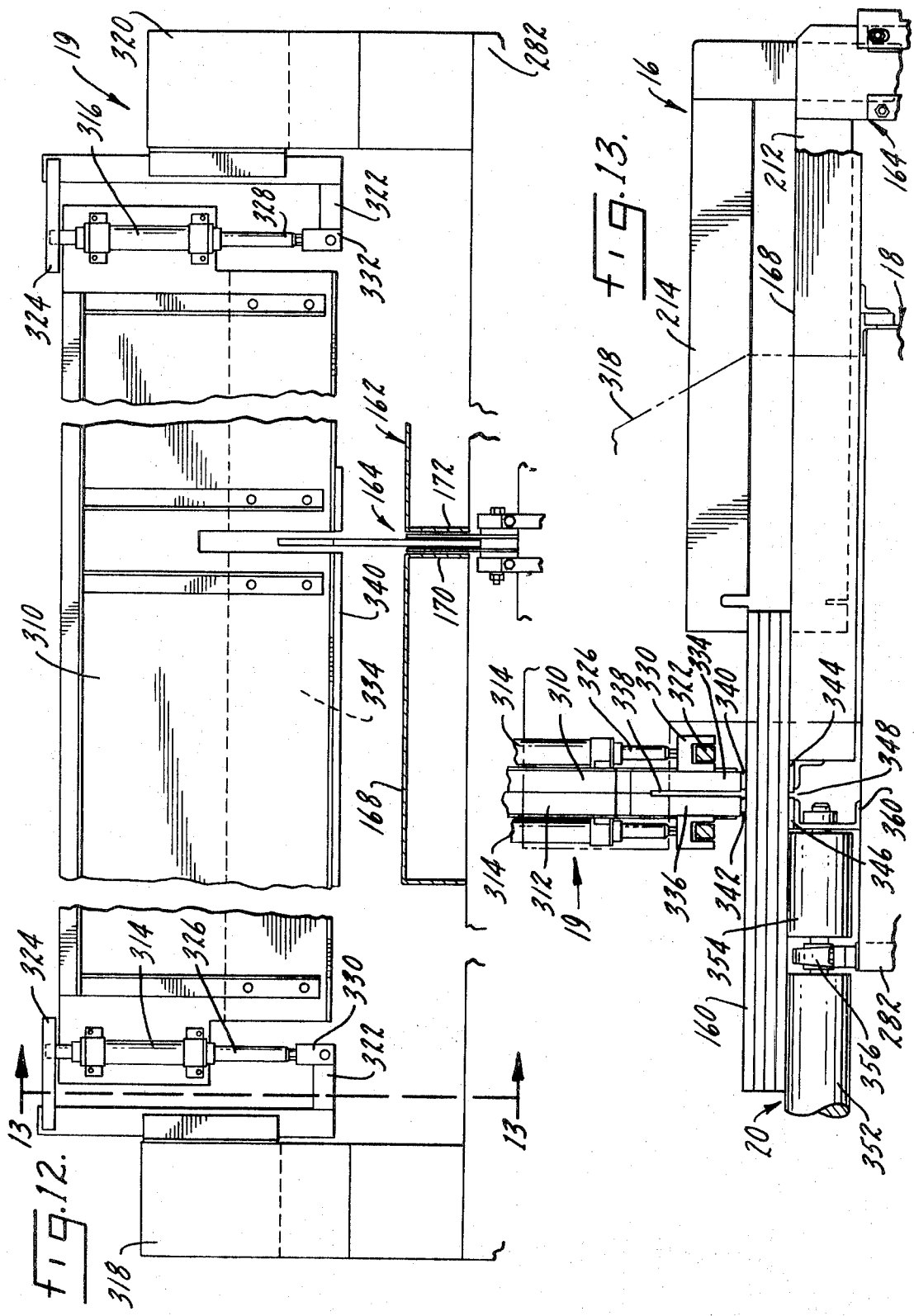

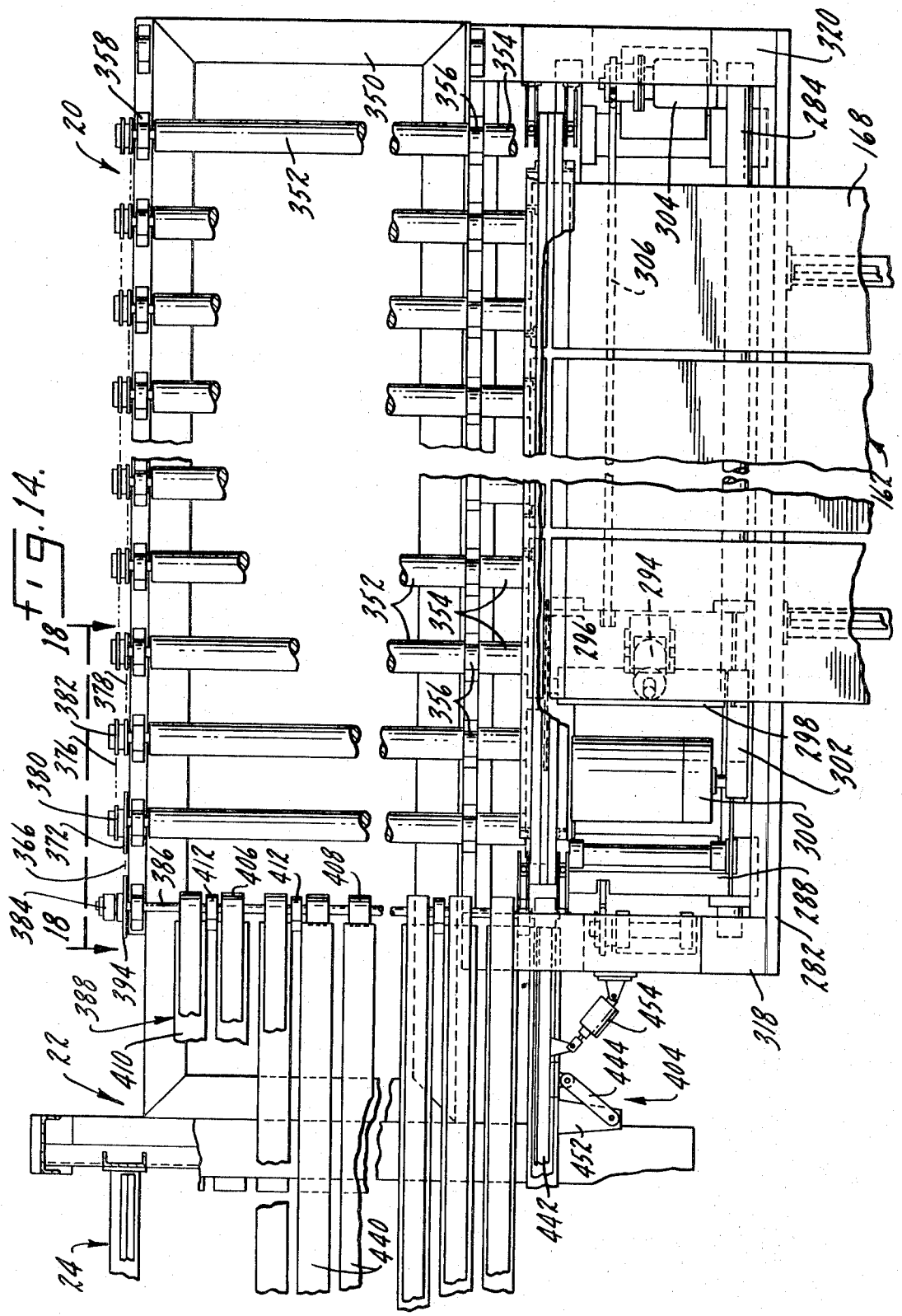

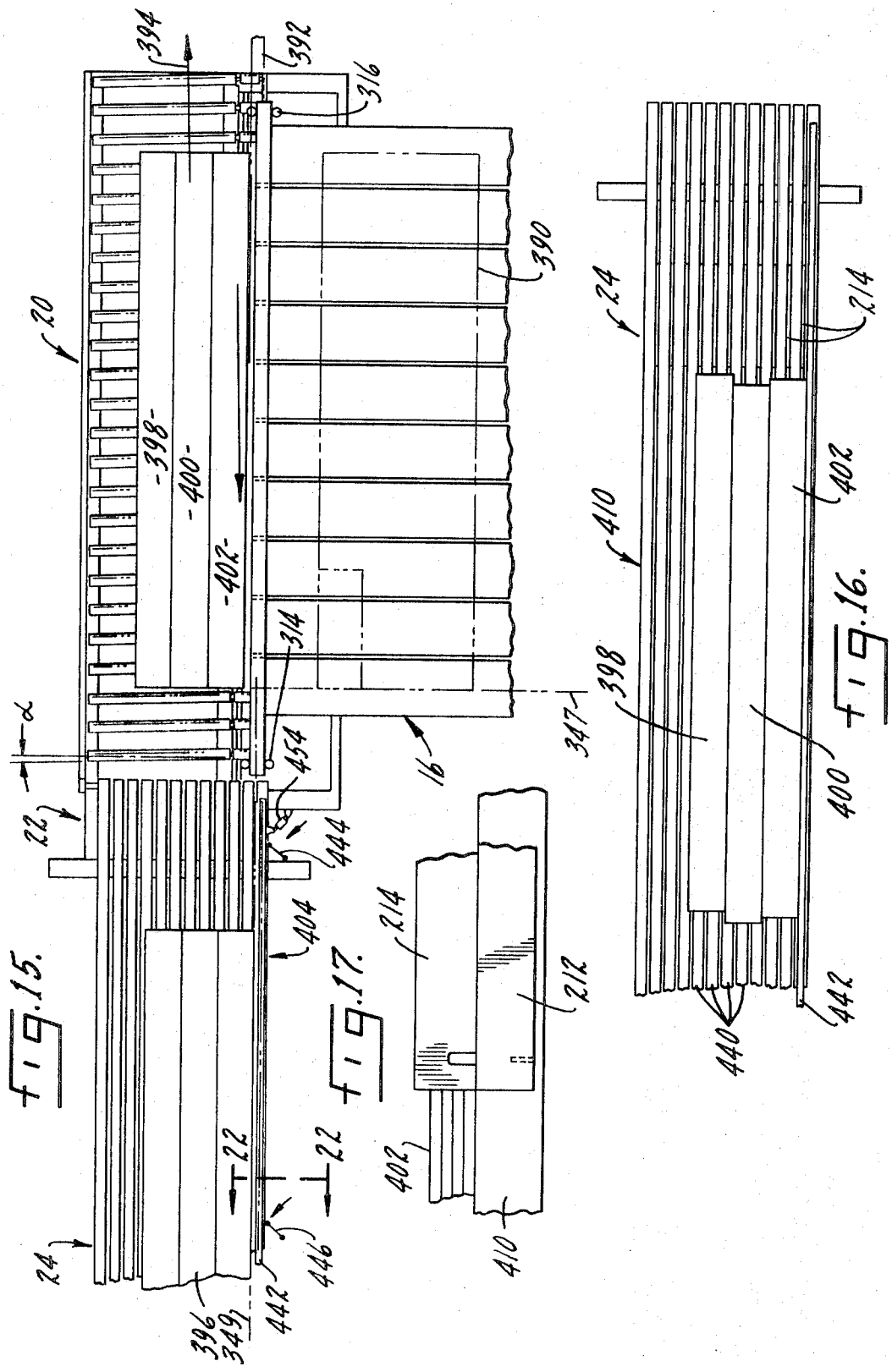

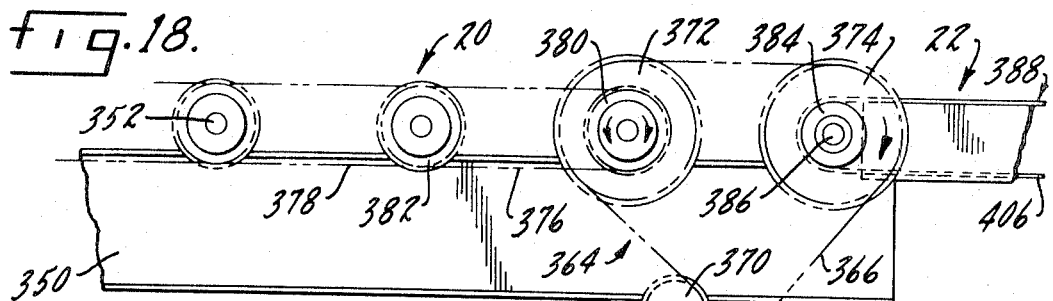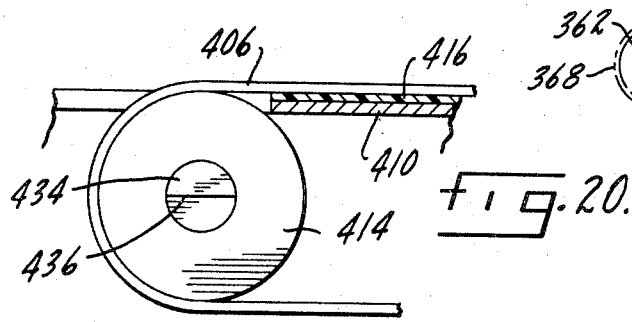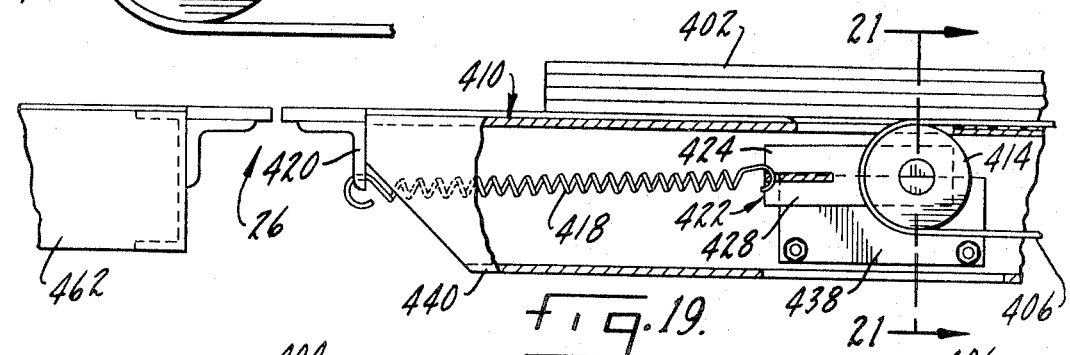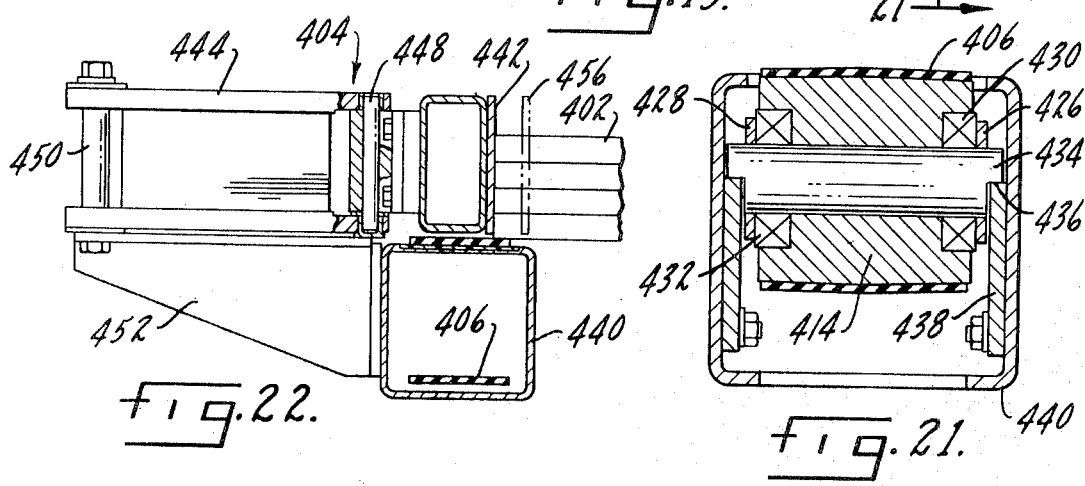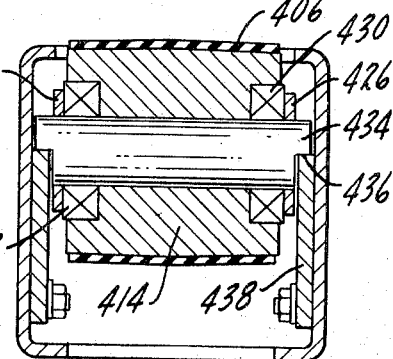

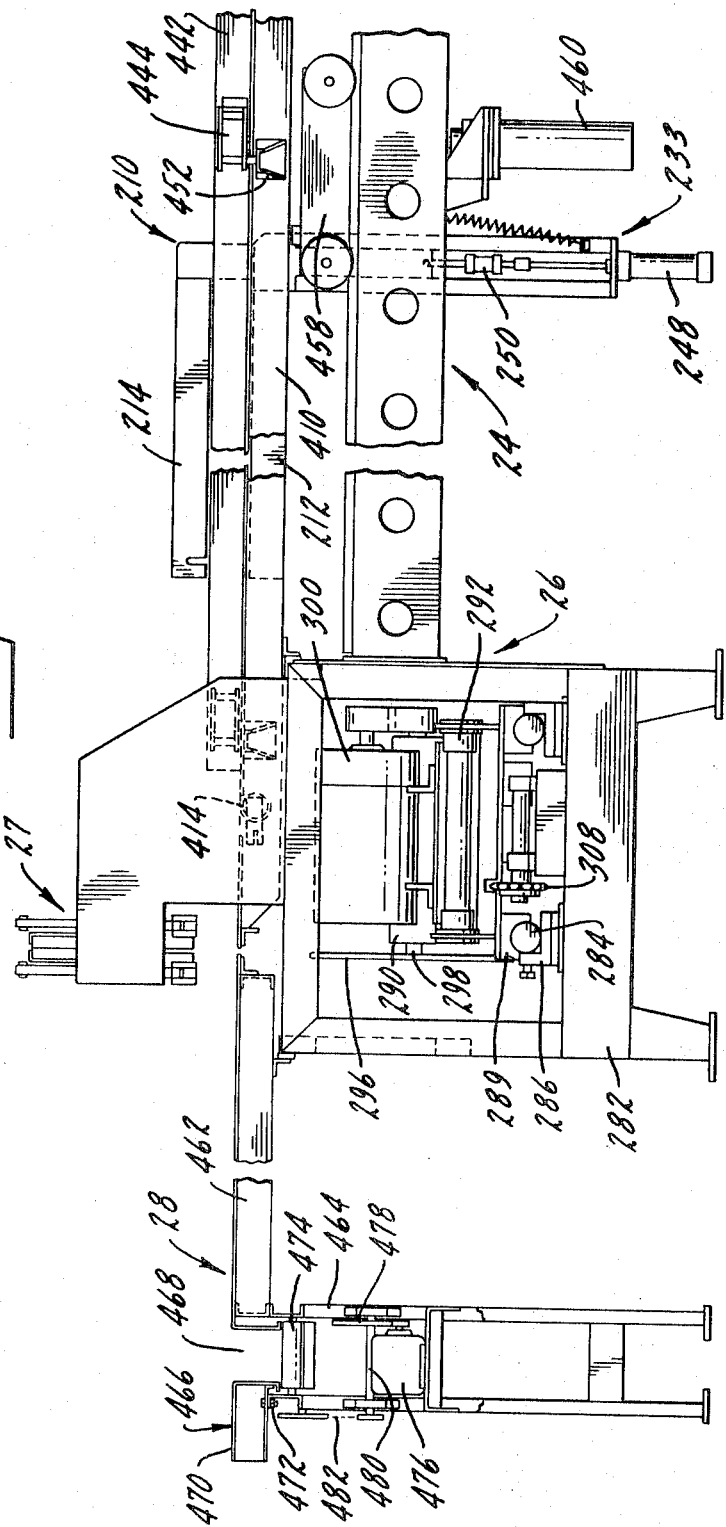

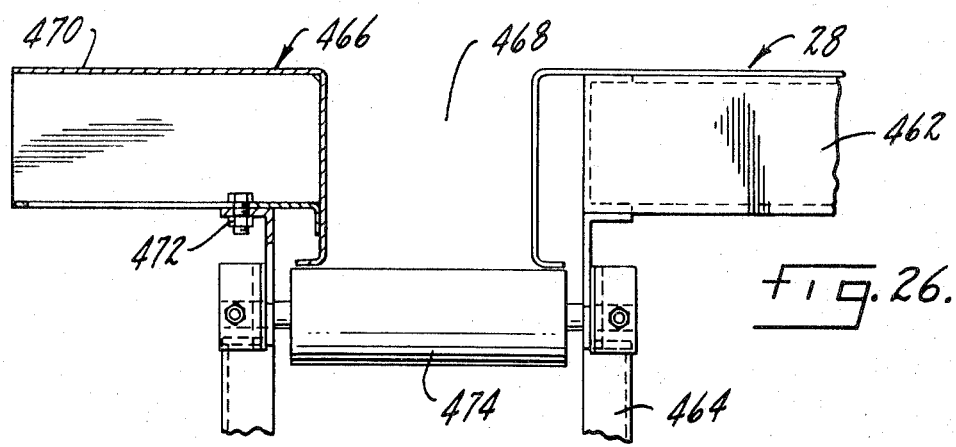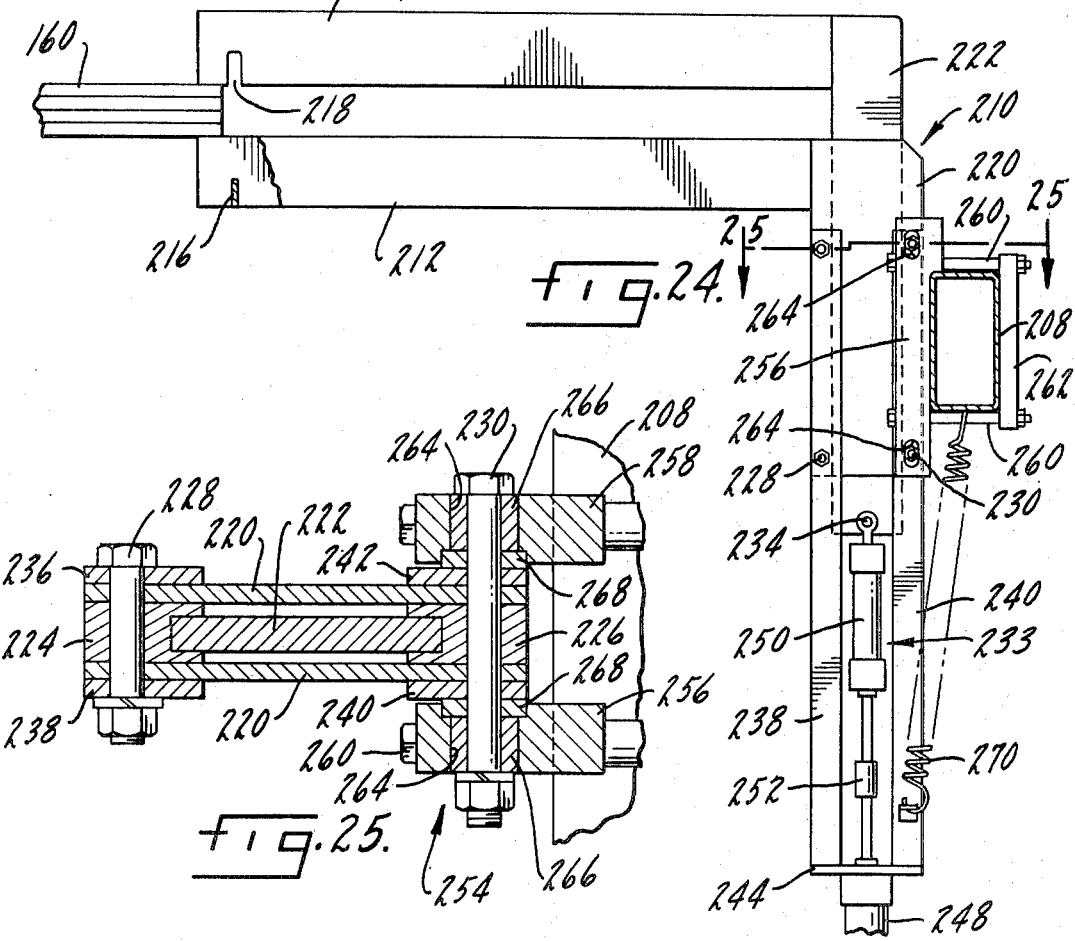

METHOD FOR CUTTING PANELS

This application is a continuation of copending application, Ser. No. 71,104, filed Sept. 10, 1970, which is a division of application, Ser. No. 805,943, filed Feb. 17, 1969, now U.S. Pat. No. 3,662,789, issued May 16, 1972.

SUMMARY OF THE INVENTION

This invention relates to the production of cut-to-size panels from sheets of material and more particularly relates to the method and apparatus for cutting accurately dimensioned panels in an unlimited combination of sizes and shapes in fully automatic, efficient steps.

The invention provides a superior method of producing accurately dimensioned cut-to-size parts from larger sheets of particleboard, hardboard, plywood, and related panel materials. Panels of this type would find use in many applications, as for example in furniture making, home building, T.V. and radio cabinet production, and the like.

Present practice is to roughly cut sheets of the material into over-sized panels which may be shipped to the manufacturer for further trimming to the finished dimensions. This means that the manufacturer must provide costly cutting equipment and manpower for the finishing operations. The present inention eliminates the need for finishing by the manufacturer since the supplier can produce panels of the exact dimensions specified, and guarantee the results.

Conventional cutting equipment is not fully automatic in that single panels are manually set-up and clamped, after which a gang of saws are moved across the sheet. Following this, the panels are again set-up by the operators for the cut-off operation. The present invention is much more efficient in that sheets are stacked and simultaneously cut to increase output, and virtually no time is required for set-up. Also, only one operator is required to run the machine since the panels are moved from station and gauged for cutting in a fully automatic operation.

The extreme accuracy obtainable with the invention not only reduces the need for finishing operations but also reduces the trim and scrap losses. By carefully selecting the patterns cut from the sheet a maximum number of panels may be made from a given "square" of stock without waste. Once this is set-up the machine can automatically reproduce the various cutting operations in the same sequence an unlimited number of times. Alternatively, the operator can readily adjust the control circuitry and selectively alter the pattern cut from the sheets so that the dimensions and shapes of the end product may be varied in any manner. There is no machine down-time in order to change one cut pattern to another.

Productivity is further increased as a result of saw sensing controls which automatically return the saw after completing a cut, no matter what the sheet width may be, so that sawing time is reduced.

The invention will produce panels with improved finished part quality, particularly in terms of smoothness of cut. A factor in this is the automatic control of linear saw speed as a function of load as well as stack cutting.

The machine comprises a number of integrated units performing a series of stacking, gauging, ripping, and crosscutting operations. The units are arranged along a pair of perpendicular axis. The infeed, stacking and rip cutting operations are performed along the first axis and the crosscutting operation produces the finished panels along the second axis.

The stock of sheet material is first placed on a charging roll unit which delivers it to a stack infeed station.

At the stack infeed the sheets are counted and moved onto a gauge unit for the rip operation, either singly or in a stack. The stack infeed can either pick off a predetermined number of single sheets to form a stack, or else push a stack of predetermined height across a gate onto the gauge table. The pusher moves this stack by means of an hydraulic motor which has a stroke comprised of two variable velocities: a rapid initial velocity which is maintained during most of the travel for machine efficiency, and a slow final velocity to bring the stack to a stop at an accurate location without sliding.

At the gauge table clamp arms grip the stack to securely hold the sheets together, and the stack is then indexed towards a rip saw unit through predetermined distances according to the pattern to be cut. Each time the stack is moved to a stop the driving motor is decelerated at an optimum rate for accurate positioning and to eliminate drive train overshoot.

The clamps establish a reference line with respect to either saw unit so that before each cut the clamps and reference line are advanced a predetermined distance. This positions the stack so that the saw unit will then cut off a stack of panels having common widths equal to the predetermined distance.

The clamps are of the caliper type adapted to float on their supporting carriage unit so that clamp carriage weight is not transferred to the panel stack.

At either the rip or cross-out saw units automatic hold-downs are provided to press the stack against the gauge table as the saw, moving from underneath, makes its cut through the material. The hold-downs are operated by pairs of hydraulic cylinders connected in a hydraulic circuit such that opposite sides of each hold-down are powered up in parallel and down in series.

At the junction of the two machine axes a rip runout unit is provided to receive material cut by the rip saw. This unit is adapted to either feed trim and scrap from the machine in one direction, or to reverse itself and feed the panels to the cross-cut saw along the second axis. As the panels move onto the second gauge infeed they are automatically aligned by a movable fence.

The cross-cut operation is performed with a gauge unit substantially identical to the first axis equipment but with a plurality of belts on the gauge table to move the panels into position for clamping. The panels are clamped together and advanced toward the saw for accurately dimensioned crosscutting. At the cross-cut location hydraulically operated hold-downs operate in a manner identical to the first axis hold-down unit.

As the finished panels move away from the cross-cut saw the scrap will automatically fall through an adjustable slot in the table for removal to either side of the machine by an endless belt.

DESCRIPTION OF THE DRAWINGS

FIG. 1 is a perspective view of a panel cutting machine incorporating features of the invention;

FIG. 2 is a plan view in schematic form illustrating the flow of material through the units of the machine;

FIG. 3 is an elevation view of a section of the machine illustrating a portion of the charging roll unit, the stack infeed, and a portion of the gauge unit;

FIG. 4 is a plan view of the stack infeed of FIG. 3;

FIG. 5 is a sectional view taken along the line 5—5 of FIG. 4;

FIG. 6 is a sectional view to an enlarged scale taken along line 6—6 of FIG. 5 illustrating the pusher assembly for the stack infeed;

FIG. 6a is a partial view of the pusher assembly of FIG. 6 illustrating single panel infeed;

FIG. 7 is a view similar to FIG. 6 illustrating a modified pusher assembly adapted for single panel infeed;

FIG. 8 is a sectional view to an enlarged scale taken along line 8—8 of FIG. 3;

FIG. 9 is an elevation view illustrating the relationship of the stack infeed, gauge unit, rip saw unit and rip run-off showing the pusher assembly moving a stack;

FIG. 10 is an enlarged view of a portion of FIG. 9 illustrating indexing of a stack to a sawing operation;

FIG. 11 is a side elevation view of the rip saw illustrating movement of the saw and carriage along the work piece;

FIG. 12 is a side elevation view, partially broken away, of a typical hold-down unit at a saw location;

FIG. 13 is a sectional view taken along the line 13—13 of FIG. 12;

FIG. 14 is a top plan view of the rip saw, rip run-out, and a portion of the cut-off infeed unit;

FIG. 15 is a top plan view similar to FIG. 14 and to a reduced scale diagrammatically illustrating movement of the work material through the machine;

FIG. 16 is a top plan view similar to FIG. 15 of the cut-off infeed illustrating movement of the work material;

FIG. 17 is an enlarged side elevation view illustrating alignment of the work material on the cut-off infeed by snubbing action of the clamps;

FIG. 18 is a side elevation view as viewed along line 18—18 of FIG. 14 illustrating the drive arrangement for the rip run-out and cut-off infeed.

FIG. 19 is a side elevation in partial section of the output end for the cut-off infeed drive;

FIG. 20 is a detail side elevation view on an enlarged scale of the output end for the cut-off infeed drive;

FIG. 21 is an elevation view in section taken along line 21—21 of FIG. 19;

FIG. 22 is an end elevation view in section taken along line 22—22 of FIG. 15 showing the four-bar work alignment mechanism;

FIG. 23 is a side elevation view of the gauge unit, cross-cut saw station, and scrap discharge for the cut-off operation;

FIG. 24 is an enlarged side elevation view of a portion of the gauge unit of FIG. 24;

FIG. 25 is a top plan section view taken along line 25—25 of FIG. 24;

FIG. 26 is an enlarged elevation view, partially sectioned, of the scrap discharge unit of FIG. 23;

DETAILED DESCRIPTION

Figure 27:
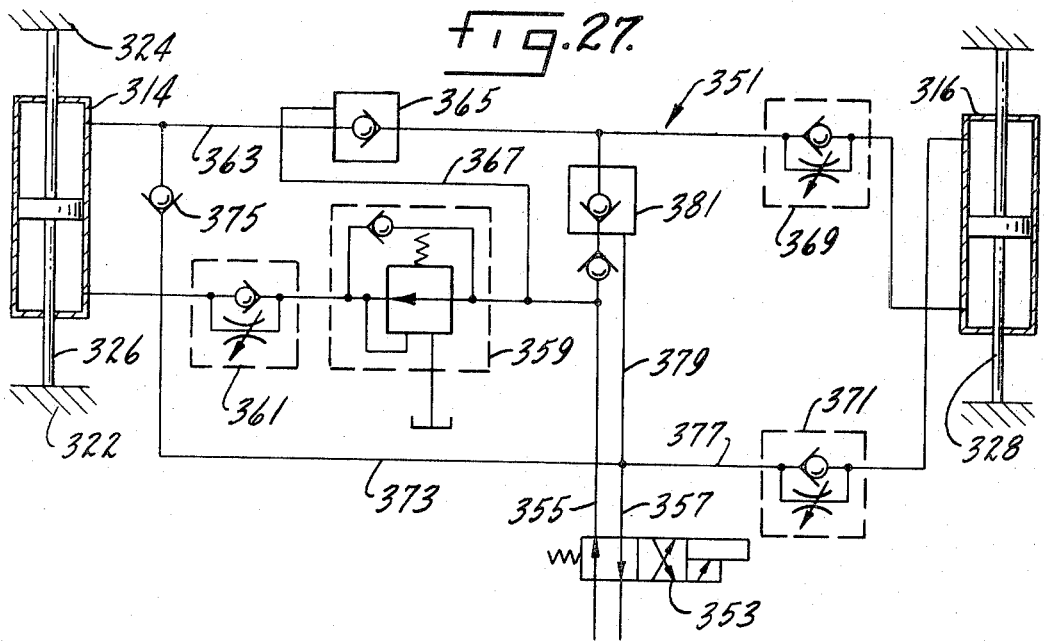
FIG. 27 is a diagram illustrating the control circuit for a typical hold-down unit of FIGS. 12 and 13.

Referring to the drawings and particularly FIG. 1, the preferred embodiment of the panel cutting machine is illustrated generally at 10. Machine 10 comprises a charging roll unit 12, a stack infeed section 14, a first gauge unit 16, a rip saw unit 18, a rip hold-down 19, a rip run-out 20, a cut-off infeed 22, a second gauge unit 24, a cross-cut saw unit 26, a cross-cut hold-down 27, and a cut-off scrap and finished panel discharge unit 28.

A panel cutting operation is initiated by depositing stacked sheets of work material on charging roll unit 12 by means of a forklift truck, conveyor, or other suitable means. The work material may be particleboard, hardboard, plywood, and other related panel materials.

Machine 10 is adaptable for cutting work material of a variety of sizes and thicknesses into finished panels of any desired dimensions with a high degree of accuracy. As shown in FIG. 2 the work material deposited at charging unit 12 is serially conveyed along axis Y for counting, stacking, clamping and gauging for transverse rip sawing into panel sections. Excess trim from this sawing is then discharged away from the machine and the panel sections are conveyed at right angles along axis X for alignment, clamping, gauging and cut-off sawing with automatic scrap discharge as the finished panels move from the machine.

CHARGING ROLL UNIT 12

Referring to FIG. 3 a portion of the charging roll unit 12 is illustrated in greater detail. This unit comprises a frame 30 supporting a plurality of spaced, power-driven rollers 32. A suitable motor 34 and drive train 36, which may be of the link-chain or belt type, simultaneously drive the rollers under control of a suitable central control system, not shown. The stacked sheets of work material placed on unit 12 are then driven across idler roller 38 into stack infeed 14. The charge of work material moved into the infeed may be of any given number of sheets but typically would be sufficient for charging the machine with a number of stacks, depending upon sheet thickness, for continuous sawing operation.

STACK INFEED 14

Stack infeed 14 provides a combination single or multiple panel infeed function. Single panels may be automatically counted off from the charging stack and moved onto gauge unit 16, or else a stack of predetermined height can be moved as a unit. Either method will feed a predetermined number of stacked sheets for subsequent cutting operations, and thus may be automatically varied by the control system according to the number of finished panels desired.

Referring to FIGS. 3 and 4 stack infeed 14 includes an elevator assembly 40 working in coordination with pusher unit 42. The elevator assembly comprises a platform 44 mounted for vertical movement along four upstanding columns 46, 48, 50, 52 mounted on a suitable foundation. A plurality of spaced-apart rollers 54 are mounted within the elevator assembly. Rollers 54 are simultaneously driven by a suitable motor 56 and drive train 58 to move the work material forward over the platform in timed relationship with charging roll unit 12. The rollers, motor, and drive train are preferably mounted for vertical movement with platform 44, although it could be otherwise with these components suitably anchored to the machine frame or foundation between columns 46-52 and with lateral slots in the platform surface exposing the roller tops.

Elevator 40 is powered up and down by means of threaded shafts 60 rotatably mounted adjacent each column. Each shaft threadably engages respective nuts 62 secured to the corners of platform 44. The threaded shafts and elevator may be powered by any suitable means, preferably a pair of electric motors 64 and 66 geared to laterally extending drive shafts 68, 70. The drive shafts are connected directly through suitable gearing with each shaft in columns 46, 52 and through a pair of chain drives 72, 74 and bevel gearing with each shaft in column 48, 50.

Motor 66 is connected with drive train 76 to move elevator 40 down and motor 64, which preferably has a higher power capacity, is connected through couplings 78 to drive the elevator up, both motors being controlled in timed relationship with pusher assembly 42 to move a predetermined number of sheets resting on the elevator into the proper elevation to be moved forwardly onto gauge unit 16. Although a pair of electric motors are shown, it is understood that other types of motive power means could be used to elevate the work material in the manner described.

Pusher unit 42 is illustrated in FIGS. 3-7 and comprises a plurality of laterally spaced pusher assemblies 80 mounted on a pair of side-by-side carriages 82, 84 which in turn are mounted for traversing movement along the length of overhanging frame 86. Although a pair of carriages 82, 84 are illustrated, the number employed in any particular design would depend on the number of pusher units and maximum sheet width capacity.

Overhanging frame 86 comprises four U-section beams 88, 90, 92, 94 secured at opposite ends by suitable braces 96, 98 and at intermediate locations to columns 46-52, with cross-bracing provided by a pair of beams 100, 102. The overhanging ends of frame 86 are suspended from beams 100, 102 by means of a plurality of cables 104. A platform 105 mounted above beams 100, 102 is provided to mount the motors and drive arrangement for elevator 40. A trolley rail or track 107 is mounted in each of the beams 88-94 lengthwise of the frame.

Each carriage 82, 84 comprises a frame or platform 106 mounted to roll along frame 86 by means of a plurality of grooved wheels 108 rotatably mounted to platform 106 and guided along rails 107.

Traversing movement of pusher unit 42 is controlled by operation of motor 110 and drive train 112 mounted at the forward end of frame 86 and functioning in timed relationship to elevator operation in accordance with the predetermined program. As illustrated in FIG. 4 motor 110, which preferably is a conventional rotary hydraulic motor powers countershaft 114 through drive train 112 and sprocket 116. Rotation of countershaft 114 traverses pusher unit 42 forward and backward by a suitable drive train, preferably a plurality of link chains 118 trained between drive sprockets 120 and idler sprockets 121, with the free ends of the chains anchored by suitable means to the pusher units, as illustrated in FIG. 6.

Each pusher assembly 80 comprises a pusher arm 122 pivoted at 124 to a bracket 126 depending from and bolted to pusher platform 106. A plurality of such pusher assemblies are provided at laterally-spaced positions 128, 130 along each of the carriages 82, 84, although only one such assembly 80 is illustrated in FIG. 5 for clarity.

Pusher arms 122 are pivoted downwardly by means of springs 132 each connected between stop bar 134 on the carriage and the rearward portion of the arm. Each arm may be secured upwardly in an inoperative position, illustrated by dashed lines, with a pin or bolt inserted through hole 135 in bracket 126 and a registering hole, not shown, in the arm. This would be desirable where one or more of the arms are not needed, as when the sheet width is less than the maximum capacity of the machine.

When pusher unit 42 is at its maximum rearward travel indicated in FIG. 3 pusher arm 122 moves downwardly to an extent determined by means of adjustable cap screw 136 between stop bar 134 and the arm. This adjustment prevents the arm from hitting gate 144, illustrated in FIG. 3, during infeed operation. A stop bar 137 may be mounted on arm 122 with an adjustable stop or cap screw 139 engaging the top of stack 140 This determines the extent that forward face 138 of the arm projects below the stack. The elevator in turn elevates the stack so that a predetermined height thereof extends above upper edge 142 of gate 144. Gate 144 forms the forward wall of gauge unit 16 so that the stack height extending above gate edge 142 is moved directly onto the top of gauge unit 16 by the pusher unit as it moves forward. This strips off the desired number of sheets. Gate 144 is vertically adjustable by suitable means, such as a slot and bolt arrangement, to accurately position it relative to the elevator.

After pusher unit 42 reaches the extent of its forward travel on frame 86 to move the material stack to a stop on the gauge table the control unit reverses motor 110 to return the pusher unit to its rearward position for the next feeding cycle. At the same time elevator 40 indexes upwardly a predetermined height to position the next work material for charging.

For relatively large panels, on the order of from three-fourths to 2 inches in thickness, measurement of stack height above gate edge 142 is accurate enough to determine the number of sheets which the pusher arm will strip off as a unit for feeding. On thinner panels, on the order of from one-eighth to three-fourths inch in thickness, it has been found expedient to feed a single panel at a time from the elevator. The control system counts the number of panels thus moved until the desired number is deposited on the gauge unit.

Single panel feeding may be provided by the arrangement of FIGS. 6 and 6a in which a pusher roller or wheel 145 is mounted on each arm 122. Roller 145 preferably comprises a rubber tired friction wheel rotatably mounted by means of a conventional cam (one-way) clutch 147 which locks up the wheel as it moves forwardly to produce a high static friction between the tires and the top sheet. The control system operates hydraulic motor 110 by an abrupt opening of its valve control to develop the highest force for the tire static friction at the instant the sheet is to start sliding from the stack. This abrupt start overcomes the static friction between the top and second sheets since the combined friction of the rubber tires is many times greater than the friction of sheet on sheet. Clutch 147 operates to freely rotate the wheel as it moves rearwardly over the stack and returns for stripping off the next sheet. As each sheet is stripped off, spring 132 pivots arm 122 to provide pressure on roller 145 and increase tire friction against the sheet.

A ramp 151 is secured to the underside of each arm 122. The ramp preferably comprises metal strip welded to the arm with a ramp surface 153 inclined downwardly and forwardly to a position just clearing the bottom of wheel 145. As each sheet is stripped off roller or wheel 145 will drop from the leading edge of the stack while arm 122 pivots downwardly, During rearward return of the pusher unit ramp surface 153 contacts the front edge of the next sheet on the stack and guides the arm upwardly until the wheel makes contact. The ramp insures that the wheel contacts the top sheet at a relatively small angle with respect to the vertical. Otherwise the wheel could strike the sheet with such force that it would be displaced to the rear.

To insure effective frictional contact between wheels 145 and the stack means are provided to continually remove any dust material which may collect. Preferably this comprises a pair of brushes 155, 157, such as nylon bristle brushes, mounted on arm 122. Brush 155 is positioned to wipe dust from the wheel while brush 157 clears the wheel path as the wheels roll back over the stack.

FIG. 7 illustrates a modification which provides positive stripping action for single panel feeding. A pusher tang 146 is pivotally mounted at 148 to arm 122. An adjusting cap screw 149 is mounted at the forward end of the tang for engagement with a laterally extending dowel 150 secured to arm 122. A supporting roll or wheel 152 is rotatably mounted on the arm at 154 to carry it over the upper surface of material stack 156. Adjustment of cap screw 149 will selectively vary the extent of tang 146 overhang below wheel 152 to compensate for variations in sheet thickness.

For single panel feeding stop bar 137 may be removed from arm 122, as desired.

As the pusher unit of FIG. 7 advances the tangs 146 of each pusher assembly will engage the rearward edge of the top sheet and move it forward for deposit onto the top of gauge unit 16. As the pusher unit returns the tangs 146 pivot upwardly upon engaging the stack, and wheel 152 rolls over the surface of the top sheet. When the pusher unit returns to its initial rearward postion the tangs will clear the rear edge of the stack and drop down for engaging the next sheet. This cycle is repeated a predetermined number of times until the desired number of sheets are dposited on the gauge unit. As required, elevator 40 may be indexed upwardly a height sufficient to position the stack for the feeding cycles.

After the desired number of sheets are on the gauge unit just forward of gate 144, the control system lowers elevator 40 so that the charge stack is free of the pusher unit, as indicated at 158 in FIG. 9. Pusher arm 122 then drops downwardly by gravity and the action of spring 132 to the position of FIG. 6, the motor 110 is energized. This traverses pusher unit 42 forward so that pusher arm 122 engages stack 160 and moves it forward to clear the gauge clamps, as shown in FIG. 9. Following this the pusher unit is returned to its rearward postion of FIG. 3 and the elevator raises the stack for the next infeed charge. The controls now operate the machine through the gauging cycle.

Hydraulic pusher motor 110 accurately positions the stack on the gauge table for clamping. Known parameters of the frictional coefficients of the stack and gauge table, the stack inertial forces, and motor 110 driving forces are predetermined and integrated into the central control system. The central control signals motor 110 to operate at a rapid initial velocity maintained during most of the travel for machine efficiency, and a slow final velocity to bring the stack to a stop without sliding beyond the preselected location.

GAUGE UNIT 16

Referring to FIGS. 3, 8 and 9 gauge unit 16 comprises a gauge table 162 for supporting panel stack 160, gauge clamps 164 for clamping the stack, and clamp carriage 166 for moving the clamped stack along the gauge table in relation to saw unit 18.

Gauge table 162 comprises a plurality of longitudinally extending plates 168 having downwardly extending side flanges 170, 172 spaced apart to define a slot or channel through which respective gauge clamps 164 traverse to and from the saw unit. Plates 168 are mounted at their rearward end by suitable means such as frame 174, and at their forward end on saw unit 18.

Gauge carriage 166 comprises a carriage frame 176, FIGS. 3 and 8, supported at either side by pairs of wheels 178, 180 mounted in suitable anti-friction bearings. The wheels are guided on a track 182 mounted on the top of a beam 184 mounted lengthwise between frame 174 and saw unit 18.

Carriage 166 is driven along the rails by means of a conventional hydraulic serve-type motor 186 to provide accurate positioning of the carriage, and thus the clamps and stack, with respect to the saw location. This eliminates any gauging error which might be produced by backlash in the transmission. Motor 186 powers the carriage through a suitable drive connection, which may include connector 188, worm gear reducer 190, connectors 192, 194, shafts 196, 198, and pinion gears 200, 202 which drivingly engage racks 204, 206 mounted on the inside of beams 184. The control system directs a given distance command or signal, depending on the desired gauging displacement of carriage 166, into motor 186 which turns a predetermined number of revolutions to drive the carriage through the rack and pinion arrangement.

Deceleration of the load is such that the stack is pushed to a stop by servo motor 186 so that the stack can be accurately postioned relative to the saw. Otherwise the stack could coast beyond the desired saw location. At the smae time, any slack in the carriage drive train is continually taken up so that such slack does not affect gauging.

Figure 28:
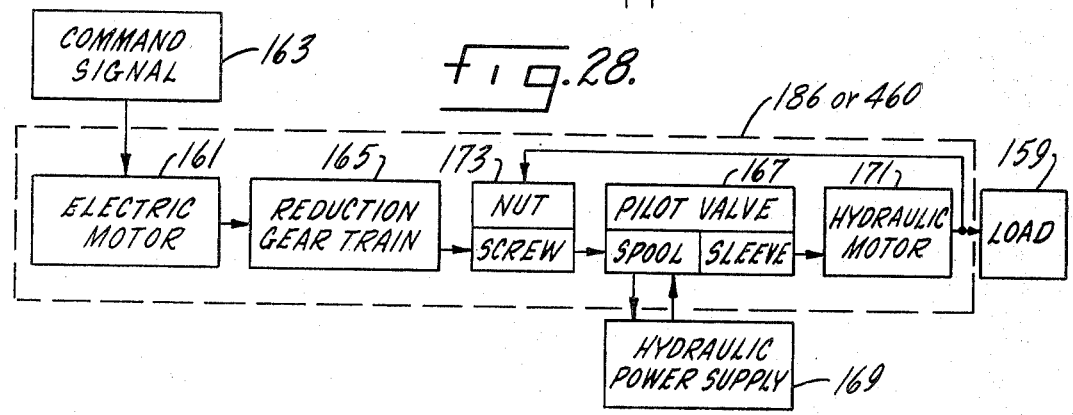
FIG. 28 is a diagram illustrating the control and operation of the serve motors for the gauge carriage.

The diagram of FIG. 28 illustrates the construction and operating control system for servo motor 186, and it is understood that servo motor 460 for gauge unit 24 is similar in construction and operation. These motors can be either digital or analog hydraulic servo motors. One example would be an electrohydraulic pulse motor in which each step of its electric motor is followed by a step of the hydraulic motor output shaft connected with the transmission to drive load 159, which would include the stack.

The high speed electric stepping motor 161 follows the input command pulses or signals originating from the control system at 163 to drive reduction gear train 165. This gear train reduces the rotation of motor 161 to a fixed angle per signal, and in turn operates four-way pilot valve 167, consisting of a rotary-linear spool and sleeve. Valve 167 controls fluid flow from hydraulic power supply 169 into axial type fixed-displacement hydraulic motor 171 proportional to the relative deviation of sppol and sleeve. The rotating speed of motor 171 is proportional to the flow rate from the valve, with mechanical feedback 173 provided through a nut fixed to the motor shaft and a screw fixed to the valve spool reducing relative deviation between the spool and sleeve.

Figure 29:
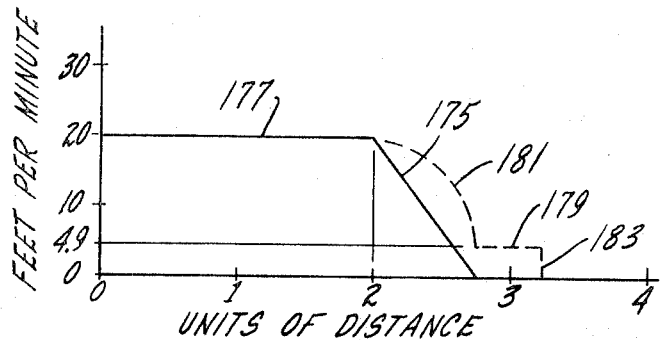
FIG. 29 is a graph illustrating operation of the servo motors of FIG. 28.

The graph of FIG. 29 illustrates the operation of the servo motors, with stack velocity indicated as a function of unit distance along the gauge table. Assuming that the stack load is moving along the gauge table by the gauge carriage, there is a normal drag as a result of sliding friction on the table. If the driving force were completely removed the load would come to a stop following the curve indicated at 175, as an example. With applicant's invention the control system of FIG. 28 is adjustable as to initial velocity 177 and final velocity 179, with a precalculated exponential fixed rate change 181 decelerating the load while maintaining a driving force, instead of removing it as in a freely sliding stop. When the load reaches velocity 179, which is at a very low value, the driving force is then removed and the small amount of kinetic energy remaining within the moving masses is absorbed in these masses as well as the machine structure, thereby allowing an instantaneous stop at an accurately located position 183.

The control system is preset using the known frictional coefficients of the stack and gauge table, the inertial forces of the stack, gauge clamp and carriage, and the driving force of motor 186 so that the energy input is always greater than the kinetic energy during a freely sliding stop. This insures that the stack is decelerated to and does not slid beyond, the desired location.

Each of the identical gauge clamps 7 164 is secured to carriage 166 by means of a lateral support 208 integral with and forming the forward support for the carriage. Each gauge clamp is mounted on the carriage in a floating arrangement best illustrated in FIG. 24 showing the arrangement for gauge clamp 210 of gauge unit 24 on the X axis.

Each of the gauge units 16 and 24 are of substantially identical construction with identical gauge carriages, tables and clamps. FIG. 24 illustrates a modification for the X axis gauge clamp in which a double extension actuator is provided for alignment purposes, as will subsequently be explained. Except where parts may differ, identical reference numerals refer to corresponding parts for the two gauge units in all views.

Each gauge clamp 164, 210 comprises a caliper clamp type arrangement having a pair of laterally spaced-apart lower jaws 212 and a single upper jaw 214 vertically movable from its lowered, nestled position between the lower jaws (FIG. 3) and to its upper, extended position (FIGS. 8, 10 and 24). Lower jaws 212 are supported at their forward end by cross brace 216, and a slot 218 is provided in the upper jaw to clear this support when lowered. Each of the lower jaws 212 has a rear support or extension 220. The upper jaw has a rearward support or extension 222 mounted for vertical sliding movement between supports 220 by means of a pair of mutually facing channel members 224, 226 secured together by suitable fasteners, such as bolts 228, 230.

Vertical movement of upper jaw 214 is effected through operation of double-acting actuators 232 (Y axis) and 233 (X axis), which preferably are air operated, although they could be hydraulic rams or the like. The actuators are connected at one end to upper jaw extension 222 at 234 and at their lower end to a bracket 244 secured to four downwardly extending supports 236, 238, 240, 242 bolted to jaw supports 220.

For clamp 164 on the Y axis actuator 232 preferably comprises a single air cylinder 246 secured at one end to support 244 and with the upper end of its rod secured to jaw support 222. In the modification of FIG. 24 for clamp 210 on the X axis actuator 233 comprises a pair of air cylinders 248, 250. Cylinder 248 is connected at one end to support 244, as above, and with cylinder 250 connected to jaw support 222 with its rod secured to the rod of cylinder 248 at connection 252. The function of the double ram modification is explained hereinafter in connection with FIG. 17.

The entire gauge clamp is arranged to float with respect to the carriage through a sliding connection 254, shown in FIG. 25. This comprises a pair of brackets 256, 258 secured to carriage support 208 by suitable means such as bolts 260 and bracket 262. Pairs of vertically aligned elongated slots 264 are formed in each bracket 256, 258. The clamps are slidably mounted within the slots by means of bushings 266 and spacers 268 mounted on bolts 230. Tension springs 270 mounted at one end to clamp support 240 and at their other end to carriage support 208 urge the gauge clamps upwardly in the slots with respect to the carriage and thereby support a part of the weight of the clamps and actuators.

With the clamps arranged to float in this manner the weight of the carriage is not added to the weight of the stack, and at the same time this prevents the upper clamp from applying any clamping force between the gauge table ans stack. Part of the clamp weight is carried by the stack, with the remainder carried by the springs. Where only a few, light sheets are being gauged this added clamp weight will insure sufficient frictional drag to stop the stack in accordance with the preset program of the control system.

Referring to FIGS. 3 and 9 the gauge clamp is illustrated with cylinder 246 retracted so that upper clamp 214 is nestled between lower clamps 212, both of which thus have their top edges substantially flush with gauge table 162. With gauge unit 16 in its maximum rearward position stack 160 is slid on the table by the pusher unit forward over the clamps to a position clearing the clamp forward edges, as illustrated in FIG. 9. Following this the pusher unit is moved rearwardly for its next cycle and the control circuit then actuates cylinder 246 to extend jaw 124 upwardly its maximum travel, servo motor 186 in actuated to move gauge carriage 166 forwardly until the clamp jaws overlap the rearward edge of stack 160, the carriage is stopped, and ram 246 retracted so that the jaws clamp the stack, as illustrated in FIG. 10. Overlapping of the jaws on the stack edge may be from one-half to 2 inches, as an example, and is calculated so as to provide adequate clamping without undue trim loss. Once the amount of overlap is set up into the control system, it need not be changed throughout repetitive cycling.

The stack is cantilevered out from the jaws and carriage, as shown in FIG. 24, in order to provide clearance for the gauge unit over the saw unit. This is a matter of the location of components and could be varied depending on the particular design configuration arrived at.

The clamping force is precalculated to insure against relative sliding of the panels for the slickest material which will be handled. This clamping force is coordinated with the inertial forces and the coefficient of friction between the panels for such material so that when the stack is decelerated to a stop no relative sliding of the panels occurs. It is important to prevent panel sliding for accurate gauging of the panel width and to insure that the cuts are square.

Although it is old to clamp stacked material for cutting, with applicant's novel invention the entire stack is clamped and moved accurately relative to the saw as the method of gauging the rip and cut-off dimensions. This is accomplished by establishing a bench mark or reference line on the stack through means of the clamps and then accurately moving this reference line relative to the saw for each cutting operation.

The gauging operation by means of establishing such reference line is illustrated in FIG. 10. With stacked sheets 160 resting on table 162 and tightly gripped between the clamp jaws a reference line 272 is established in a position fixed with respect to the stacked panels. Although reference line 272 is indicated as aligned with a forward edge of upper jaw 214, the line could be located at other positions relative to the clamps with corresponding adjustments made in the control circuitry for gauging, as long as this reference line remains fixed after the parameters of the control operation are determined.

With the known, fixed reference line 272 established relative to the stack, and with the exact position of this reference line relative to saw location 274 known, the exact distance a between the two is also known and sensed by the control system. The leading edge of the stack at this time is indicated by the dotted line at 276, FIG. 10.

The control system is now ready to initiate cycling of gauging for the first rip cut, which usually would be to trim the leading edge. The control circuit signals servo motor 186 to turn a predetermined number of revolutions and move gauge carriage 166 forward until reference line 272 reaches distance b from saw position 274. At this time the upper jaw is at the position indicated at 214' while the leading edge of the stack overlaps the saw at 276' for trimming. Next, the control circuit signals hold-downs 19 and saw unit 18 to operate through their cycles and make a first rip cut. After this gauge unit 16 cycles through one or more subsequent gauging operations to move the stack forwwardly for further rip cuts which separate the stack into one or more sections having accurately dimensioned and squared rip edges.

At the completion of the last rip cut just forward of upper jaw 214 pressure on the gauge clamps is released to free tail material 278, and the gauge carriage is moved backwards to the position of FIG. 9.

The leading trim portion at 276' and each of the panel sections cut by the machine are moved forward onto rip run-out 20 as the gauge unit indexes the stack for each following cutting operation. Stack tail material 278, released by the clamps, is moved forward onto rip run-out 20 by the subsequent stack being pushed forward for its trimming operation.

During gauging the predetermined distance which the control circuit moves the reference line 272 includes the korf or width of saw cut made by the previous sawing operation. Thus, if it is desired to cut a panel of given width, then the control circuit would index the reference line forward this width plus the saw korf width 280, which information is precalculated and fed into the control circuit.

After a saw blade is sharpened the new Korf cut by the blade is narrower than before. To compensate for this, information on the number of times the blade has been sharpened is fed into the control circuit so that the Korf compensating distance added to desired panel width for each gauging operation can be varied accordingly. For example, if a new blade is to be sharpened twice in use then three different kerf widths would be set into the control system, one each for sawing with a given blade condition.

SAW UNITS 18 and 26

Referring to FIGS. 11 and 14 rip saw unit 18 is illustrated, and it is understood that cross-cut saw unit 26 is substantially identical in construction and operation.

Saw unit 18 comprises a frame 282 supporting a pair of laterally extending rails 284, which may be elongated rods mounted on a plurality of cushion blocks 286, the positioning of which is illustrated in FIG. 23 for cross-cut saw unit 26. A saw carriage 288 is mounted for sliding movement on the rails by means of four bearing blocks 289. An arbor housing 290 is pivotally mounted on the carriage at 292 and an extensible actuator 294, preferably an air operated cylinder, is mounted on the carriage to pivot the arbor housing between the raised position of FIG. 11 and its lower position.

A circular saw blade 296 is rotatably mounted on housing 290 by means of arbor 298. Housing 290 mounts a saw motor 300, preferably an electric motor, which powers the saw through drive train 302.

Saw carriage 288 traverses along the rails by means of the preferred reversible hydraulic motor 304, illustrated in FIGS. 11 and 14, mounted on frame 282. This motor is drivingly connected to the carriae by means of drive train 306, preferably of the chain-link type, secured at each end to the carriage and trained over idler pulley 308 on frame 282. The saw units 18 and 26 traverse across their respective Y and X axes underneath the gauge tables to cut the stack from below. With motor 300 running, actuator 294 is extended so that the blade tip clears the top of stack 160. With hold-down 19 pressing the stack against the table, traversing motor 304 is then actuated to draw the saw through the material. When the saw completes a cut as indicatd at 296', the control system retracts actuator 294 to pivot the saw to the position indcated at 296'', and motor 304 is reversed to immediately return the saw to its start position, no matter at what location the cut is completed. As the saw returns in its lower position the blade top clears the lower surface of the stack so that stack gauging for the next cut can be made without interference from the saw.

The saw control system automatically returns the saw immediately after the stack is cut through so that time is not wasted in running the saw to it furthest position without cutting. This would occur where stack width is less than maximum for the machine.

The saw control system comprises conventional electric sensing and relays, not shown, activated by the current of saw motor 300. These relays are set to close at a point just above the motor no-load current demand to control both air cylinder 294 for raising and lowering the saw, and traversing motor 304. The relays are interlocked with saw movement so that they are not connected into the circuit until the saw is up and into its cut a few inches. As the saw enters the material the motor draws more current to close the sensing relays. As the saw completes its cut, the motor current again drops to a no-load condition, the sensing relay drops out, and this in turn activates cylinder 294 to lower the saw which in turn actuates a conventional reversing valve, not shown, to reverse the flow to motor 304 for returning the saw carriage.

Linear speed of the saw across the stack is controlled both when making the cut and when returning underneath. When cutting, this speed is modulatd as a function of load and the type of cut desired to achieve the best quality cut, particularly in smoothness of cut. When returning, the saw moves at maximum speed to increase machine output.

Electric saw motor 300 is run at constant speed so that blade tip peripheral speed is constant. To run the blade through the mateial at maximum efficiency load on the saw must be kept relatively constant. This is done by controlling linear speed during a cut, which in turn is accomplished by controlling hydraulic traversing motor 304 to run at constant speed, as for example, by a suitable flow rate control device, not shown, such as a conventional pressure compensated valve connected to the input of the motor. This liner speed would be preselected depending on the type of work material, the smoothness of cut desired, and the condition of the blade.

Where a relatively rough edge cut can be tolerated the linear saw speed can be increased to decrease cutting time. Also, each saw motor can be increased to decrease cutting time. Also, each saw motor is connected to a conventional amp motor indicating motor current, and thus indirectly indicating blade condition so that as the blade wears the operator can adjust the speed of motor 304 to reduce saw traversing speed and prevent the saw motors from becoming overloaded.

MATERIAL HOLD-DOWN UNITS 19 and 27

Referring to FIGS. 12 and 13 material hold-down 19 is illustrated in use with rip saw unit 18 and gauge unit 16. Hold-down unit 27 for cross-cut saw unit 26 is identical in construction and operation to that of unit 19. Both hold-downs function to apply a downward force against the material stack as the saw unit traverses underneath, thereby preventing displacement of the panels and at the same time improving the quality of the cut by preventing splintering and the like.

Hold-down unit 19 comprises two die-by-side hold-down members 310,312 extending traversely across the Y axis and straddling over the path of blade travel. Each hold down member is displaced vertically by pairs of actuators 314, 316 mounted at either end. Upstanding supports 318, 320 mounted on saw frame 282 support the hold-down members by means of inwardly projecting brackets 322, 324 connected to respective actuators.

The actuators are preferably conventional double-acting hydraulic cylinders. Each cylinder has a double-ended piston having a piston rod 326, 328 extending from either end of respective cylinders so that fluid volume discharge from either end is equal. The lower end of each rod is pivotally connected by clevis 330,332 to supports 322 while the upper end is guided within a lateral slot in support 324 to accomodate any cocking of the hold-down members during operation.

Each hold-down member 310, 312 is mounted independently of the other, and actuated separately, to accomodate any irregularities in stack height on either side of the saw blade.

A filler of soft material 334, 336, preferably of a wood such as pine, is mounted below each of the hold-down members 310, 312. The first cut the saw maken will form a slot 338 at the interface of the two fillers, and thereafter any vibration or unevenness in saw operation will be accomodated by the soft filler as the saw cuts its own path. This eliminates possible nicking of the saw against steel parts or the like and at the same time provides the closest possible holding contact on either side of the saw to reduce splintering on the top panel of the stack.

A pair of cushions 340, 342, preferably sections of rubber tubing or the like, are secured to the underside of fillers 334, 336. These cushions function to soften the impact of the hold-downs against the stack and prevent the surface of the top panel from being marred in any way.

The underside of stack 160 is supported by two strips of material 344, 346 mounted on suitable supporting brackets 360 flush with the top surface of gauge table 168 and rip runoff 20. These strips are preferably made from a laminated hardwood such as that sold under the trademark Benelex by the Masonite Corp. The strips provide strength for supporting the combined stack weight and hold-down pressure. The initial cut of the saw through the Benelex will cut slot 348 which automatically accomodates saw vibration and irregularities without nicking the blade. The strips thereby provide close support for the stack on either side of the saw so that splintering of the bottom panel is reduced and the smoothness of cut is improved.

Operation of each hold-down member 310, 312 is coordinated by the control circuit so that both actuators for each hold-down are synchronized to insure that the hold-downs come down evenly. Ths is accomplished by connecting the actuators in series on the down stroke and in parallel on the upstroke in a suitable circuit, preferably as shown in FIG. 27.

The actuators are powered up in parallel circuitry so that cylinder displacement is synchronized each time the hold-downs are raised in the event there is any oil leakage past the piston or piston rod packing. Also, each pair of actuators are operated independently of those for the adjacent hold-down member. This is to provide clamping of different heights of material under each beam at the same time, such as in trimming the leading edge of one stack with the trailing edge trim of a preceding stack, of a different height, under the adjacent hold-down.

Referring to FIG. 12 actuator 314 would be the master cylinder and actuator 316 the slave cylinder for hold-down 310, both cylinders being secured to opposite sides of the hold-down. On the down stroke the master cylinder is actuated and its discharge is directed to the pressure side of the slave cylinder. With the double-ended cylinder construction providing equal volume for either strokes of the cylinders, the cylinders of both actuators will therefore retract an equal distance relative to the fixed rods and move either side of the hold-down an equal distance. On the upstroke the actuators are connected in parallel to extend and thereby raise the hold-downs for releasing the stack.

The master ends of all hold-downs are preferably positioned on the fixed line side of the stack, i.e., the stack side which is always fixedly aligned relative to the gauge table, no matter what the stack width may be. Thus, as shown in FIG. 15, master actuator 314 for the rip saw hold-down in adjacent fixed line 347. Similarly, the master actuator for the cross-cut hold-down is adjacent fixed line 349. This provides a positive force on the stack as the hold-downs make contact irregardless of stack width along the saw line.

Referring to FIG. 27 a preferred hold-down circuit 351 is illustrated for a typical pair of actuators 314, 316. The circuit comprises a source of pressurized fluid, not shown, connected with four-way control valve 353 which is operated by the central control system to either direct fluid into conduit 355 for series operation while returning discharge through conduit 357, or to direct fluid into conduit 357 for parallel operation while returning discharge through conduit 355.

In series operation for lowering the hold-down fluid in conduit 355 is first directed into pressure reducing valve 359. This valve enables the operator to selectively reduce fluid pressure to produce the desired holding force depending on the precalculated material density and cutting forces. From valve 359 the fluid opens the check of adjustable throttle valve 361 and enters the working side of master actuator 314. As this actuator begins to move, its discharge flows through conduit 363 and through pilot operated check valve 365, which has now been opened by pilot pressure from conduit 367. The discharge continues through the check of throttle valve 369 and into the working side of slave actuator 316. Discharge from this actuator is fed through throttle valve 371 for return through valve 353.

In parallel operation for raising the hold-down, fluid in conduit 357 is directed into branch conduit 373 through check 375, into branch conduit 377 through the check of throttle valve 371, and into pilot conduit 379 for opening pilot operated check valve 381. From check 375 the fluid enters master actuator 314 which discharges through valve 361, the check of valve 359, and conduit 355. From valve 371 the fluid enters actuator 316 which discharges through valve 369, the open check of valve 381, and conduit 355.

Throttle valves 361, 369 and 371 are each adjustable to selectively vary fluid flow and thus control the speed of hold-down movement, in both up and down operation.

Following a cutting operation and release of the stack by the hold-downs gauge unit 16 pushes the trim or cut panels forwardly onto rip run-out 20 as the stack advances for the next rip cut.

RIP RUN-OUT 20

Rip run-out 20 illustrated in FIGS. 13, 14 and 15 receives work material from rip saw unit 18, discharges trim and scrap away from the machine, and directs one or more of the cut sections at a right angle along the X axis for the cut-off operation.

Rip run-out 20 comprises a frame 350 supporting a plurality of laterally spaced, powered rollers 352, 354 by means of suitable bearing blocks 356, 358. Because of the space limitation adjacent the saw, roller 352 is supported at its inboard side by cushion block 356 on saw frame 282, and a shorter roller 354 is rotatably supported at its inboard end on bracket 360 and at its other end by block 356. Each roller 354 is connected for rotation with its corresponding adjacent aligned roller 352.

Each of the rollers 352, 354 are mounted with their longitudinal axes diverging outwardly from the Y axis towards gauge unit 24, as illustrated in FIG. 15. The angle $\alpha$ of the roller slant is relatively small and can be within the range of 1–1½°, for example.

The drive arrangement for the rip run-out is illustrated in FIGS. 14 and 18. A motor 362 mounted underneath rip run-out frame 350 is connected through drive arrangement 364 to power rip run-out 20 either forward or reverse, and to drive cut-off infeed 22 forward in coordination with the rip run-out. The drive arrangement preferably comprises a drive chain 366 trained over drive sprocket 368, idler sprocket 370, roller sprocket 372 and infeed sprocket 374. A series of idler chains 376, 378 are trained between corresponding sprockets 380, 382 mounted on the ends of the rollers to drive all rollers in the same speed and direction.

The drive for cut-off infeed 22 includes a conventional over-running clutch 384 adapted to connect drive 364 with conveyor shaft 386 for clock-wise rotation, as viewed in FIG. 18, for moving panels on conveyor 388 forward, and to disconnect the same upon reversal of motor 368.

Referring to FIG. 15, operation of rip run-out 20 for the combination scrap discharge and X axis infeed is illustrated diagrammatically. Assuming that panel stack 390 on gauge unit 16 undergoes the foregoing gauging and rip sawing operations, the first work material to be pushed onto the rollers would be a strip of scrap 392 resulting from trimming or squaring of the stack. The control circuit operates motor 362 in reverse to drive the scrap away from the machine in the direction of arrow 394. Over-running clutch 384 disengages the drive from infeed 22 so that any work material 396 on gauge unit 24 is not reversed during scrap discharge. Following this, one or more panels 398, 400, 402 are cut according to the predetermined program and pushed onto the rollers. These sections are discharged to cut-off infeed 22 when the control circuit energizes motor 362 for forward operation, while at the same time driving conveyor 388 through clutch 384.

Where it is desired to cut all ripped sections into panels having uncommon cross-cut dimensions, i.e., each finished panel will have varied lengths along the X axis, then the sections ripped from the stack are discharged onto infeed 22 in single file order prior to cross-cutting. On the other hand, where it is desired to have panels with common cross-cut dimensions measured along the X axis then two or more of the ripped sections 398, 400 are pushed sideways onto the rollers, as illustrated in FIG. 15, after which they are discharged together onto infeed 22. The control system would be preset according to the desired patterns for the finished panels to coordinate operation of rip run-out 20 which gauge unit 16 for discharging the ripped sections in this manner.

After the last section from a stack has been discharged onto cut-off infeed 22, the resulting strip of tail scrap which had been gripped between the clamp jaws would be pushed onto the rollers as the following stack is advanced to the rip saw unit for its trimming operation. After the forward edge of such stack is trimmed and deposited onto the rollers then run-out 20 is actuated as explained above to simultaneously discharge both scrap strips away from the machine.

CUT-OFF INFEED 22

The cut-off infeed 22 illustrated in FIG. 14-21 includes a conveyor 388 to move the stack sections along the X axis, and an alignment mechanism 404 to align and square the sections with respect to the X axis.

Conveyor 388 comprises a plurality of longitudinally extending laterally spaced belts 406 for frictionally engaging the lower surface of the stack sections. The belts are trained over respective pulleys 408 keyed for rotation with drive shaft 386, which in turn is rotatably mounted on gauge table 410 by suitable pillow blocks 412.

The remote ends of belts 406 are trained over pulleys 414 adjacent cross-cut saw unit 26, as illustrated in FIG. 19 and FIG. 20. To reduce drag between the underside of the belts and gauge table 410 anti-friction strips 416, preferably of tetrafluoroethylene material, are bonded to the table underneath the bottom surfaces of each belt. The belts are provided with a relatively rough inside surface for gripping the drive pulleys.

Each belt is spring loaded at its far end to maintain tension in the upper belt flight in excess of the belt force required to move the load. Although it is conventional to drive a loaded belt conveyor from its discharge end, the present invention accomplishes the same result by driving from the infeed end by means of the spring loading. At the same time only one drive motor and drive train is required for both conveyor and rip runout. Thus, for example, with a 100 pound spring tension, belt tension at rest would be 50 pounds for each of the upper and lower flights. As drive pulleys 408 are operated to apply a rotational force of 10 pounds to the lower belt flight, the upper and lower belt flights would be tensioned at 40 and 60 pounds, respectively, while the discharge end pulley 414 remains under 100 pounds of tension. Thus, the traction of the belts on the pulleys does not change.

The belts are tensioned by means of spring 418 secured at one end to bracket 420 mounted at the end of gauge table 410, and at the other end to a floating bracket 422. Bracket 422 comprises a cross-brace 424 secured to a pair of arms 426, 428 which in turn are secured to bearings 430, 432 rotatably supporting pulley 414 on pin 434. Pin 434 is formed with shoulders 436 at either end supported in longitudinal sliding engagement with a pair of brackets 438 bolted to the inner sides of box section 440.

The sides of box section 440 are laterally spaced apart as illustrated in FIG. 14 to define slots for traversing movement of the clamps of gauge unit 24. The lower or return flight for each belt moves enclosed within its box section where it is protected from fouling.

Alignment device 404 illustrated in FIGS. 14, 15, 22 and 23 comprises a four-bar linkage arrangement having a side fence 442 pivotally connected at either end by two or more equal length arms 444, 446. Pins 448 connect the fence to the arms and pins 450 connect the arms to supporting brackets 452 on the gauge table.

A double-acting actuator 454 is connected with the fence to move it laterally over the gauge table to and from its maximum extent of travel indicated at 456 in FIG. 22. Control of actuator 454 is coordinated with rip run-out 20 to automatically align the stack sections as they move onto cut-off infeed 22.

Assuming that the three stack sections 398-402 of FIG. 15 are being moved by rip run-out 20, the canted axis of the rollers will urge the sections towards fence 442. As the sections enter the infeed, the conveyor belts will advance then further. At the same time, actuator 454 is extended and the four-bar linkage geometry will accordingly displace fence 442 so that it remains in parallel alignment with the X axis. The fence will engage the side of stack 402 and align it with the X axis. At the same time, any spacing between adjacent stack sections will be taken up by the combined action of fence displacement and sideways stack movement. Thus, all ripped edges will be in parallel alignment with the X axis as indicated at 396, so that subsequent crosscutting will be squared to this axis. The fence is moved at the same time that the stack sections are in motion since with the lower coefficient of sliding friction the moving stack is easier to align as compared to a stack at rest. This fence movement is initiated as the stack is decelerated to a stop, preferably within the last 1 or 2 inches of stack movement. The fence is backed off by the actuator after the stack sections are clamped in their aligned position, as explained hereinafter.

X AXIS GAUGING

Gauge unit 24 for the X axis is illustrated in FIG. 23 and comprises gauge clamp 210 and table 410, both previously described, and gauge carriage 458. Carriage 458 supports clamps 210 and is substantially identical to Y axis carriage 166. Thus, a servo-type motor 460 drives the carriage for traversing movement along the X axis to accurately index the stack sections with respect to cross-cut saw unit 26.

With carriage 458 in its rearmost position under cut-off infeed 22 and with the stack sections aligned by the fence, the conveyor belts continue to advance the sections forward to clear the ends of jaws 214, 212. Following this, upper jaw 214 is raised, carriage 458 is moved forward so that the jaws overlap each of the stack sections, the jaws clamp the sections, the fence is backed off, and the carriage is indexed to the saw unit for cross-cutting in a manner similar to the ripping operation.

One modification which can be used incorporates the double cylinder actuator 233 in place of a single cylinder. Actuators 233 operate upper jaws 214 to an intermediate position, illustrated in FIG. 17, if it is desired to first align the stack ends prior to clamping. As shown in FIG. 16 the stack sections 398, 400, 402 may possibly be discharged from the rip run-out with their ends out of alignment. To align the sections, the control circuit first operates the actuators 250 to raise jaws 214 to the intermediate position of FIG. 17. Carriage 458 is then inched forward so that the forward edges of these jaws bump against the stack sections until all are evenly aligned. After this the second actuators 248 are operated to further raise the jaws and clear the stack so that the carriage can be moved forward for clamping. The gauge unit then operates in the manner previously explained for advancing the stack sections for predetermined cut-off dimensions, which is followed by operation of hold-down unit 27 and cross-cut saw unit 26 for producing the finished panels.

DISCHARGE UNIT 28

The scrap and finished panels produced by the cut-off operation are pushed forward onto discharge unit 28 by the following work material being advanced by gauge unit 24. As illustrated in FIGS. 23 and 26 discharge unit 28 includes a table 462 connected at one end to saw unit 26 and at its other end to frame 464. An adjustable automatic scrap discharge 466 is provided at the end of table 462 to move scrap and trim away from the machine as the finished panels advance across the table.

Scrap discharge 466 comprises a transverse slot 468 defined between the end of table 462 and table extension 470. The table extension is mounted for adjustable longitudinal displacement on frame 464 by suitable means, such as slot and bolt arrangement 472, to selectively vary the width of slot 468.

Endless belt 474 is mounted underneath slot 468 to receive strips of trim or scrap which fall through the slot and to convey them away to either side of the machine. Belt 474 is powered by reversible motor 476, drive belt 478, countershaft 480, and drive chain 482.

For panels of relatively narrow cut-off dimensions or where the trim strips are relatively narrow table extension 470 would be adjusted to decrease gap width 468, or conversely to increase gap width for wider panels or wider trim strips.

As the finished panels and scrap are pushed across table 462 and the scrap drops into the slot for removal, the panels will continue across table extension 470 for subsequent removal by a suitable conveyor or stacking means, not shown.

I claim:

1. The method of feeding a predetermined number of sheets of material from a charge stack onto a gauge table for subsequent gauging by gauge clamps which index relative to a sawing station, including the steps of:

elevating the charge stack to a position with its top sheet at a predetermined distance above said gauge table; positioning the gauge clamps below the level of the gauge table;

pushing a selected number of said sheets on the stack together onto the gauge table over and forward of said gauge clamps;

elevating the remaining charge stack to a selected location for repeating said pushing step; and, elevating the gauge clamps to a level above the gauge table for gauging the thus pushed stack therewith.

2. The method of claim 1 and further characterized in that a selected number of the sheets are pushed from the charge stack one at a time and dropped onto the gauge table in stacking relationship to form a work stack; and, the work stack is pushed to a predetermined position forward of the gauge clamps for gauging.

3. The method of claim 1 and further characterized in that the pushing step includes:

frictionally gripping the top surface of sequential top sheets; and, moving each frictionally gripped sheet with a predetermined initial velocity sufficient to overcome the static frictional force between such sheet and its underlying sheets.

4. The method of claim 1 and further characterized in that the stack is stopped at a preselected location on the table by pushing with a force which decreases stack velocity to a relatively low, final velocity sufficient to enable the stack to come to a substantially instantaneous stop upon removal of the force; and, removing the pushing force when the stack reaches said location.

5. The method of feeding a predetermined number of sheets of material from a charge stack onto a gauge table for subsequent gauging by gauge clamps which index relative to a sawing station, including the steps of:

elevating the charged stack to a position with its top sheet at a predetermined distance above said gauge table;

positioning the gauge clamps out of the level of the gauge table;

pushing a selected number of said sheets on the stack together onto the gauge table forward of said gauge clamp;

elevating the remaining charged stack to a selected location for repeating said pushing step; and moving the gauge clamps vertically to a level above the gauge table for gauging the thus pushed stack therewith.

* * * * *